United States Patent Office 3,012,910
Patented Dec. 12, 1961

3,012,910
FUNGUS RESISTANT SHEET MATERIAL AND METHOD OF MAKING THE SAME
Leo J. Weaver, Creve Coeur, Mo., assignor to Monsanto Chemical Company, St. Louis, Mo., a corporation of Delaware
No Drawing. Filed Jan. 28, 1959, Ser. No. 789,474
12 Claims. (Cl. 117—138.5)

This invention relates to fungus resistant compositions and to methods of inhibiting the natural growth of fungus. More specifically, the invention provides a new and very effective fungicide capable of ready use in the treatment of soils, textiles, wood, plastics and other compositions subject to fungus attack.

The art of fungus control is well established and it is commonplace to incorporate fungicidal compounds into articles of commerce which are frequently subject to discoloration or more serious damage through fungus growth. Thus textiles, particularly in awnings, tents, tarpaulins and other fabric articles exposed to outdoor weather; plastics, particularly the cellulose esters and ethers as in photographic film and plastics generally, paints and particularly exterior surface coating films, wood impregnants and other products are frequently compounded with active fungicides for prolonging useful life of these articles and preventing unsightly discolorations.

Furthermore, naturally occurring fungus in the soil destroys agricultural products and other vegetation, and it is well known to treat the soil with fungicides in advance to prevent the growth of injurious fungus or to treat areas known to be fungus infested for the control or elimination of the undesirable organisms. Suitable solutions or suspensions of the fungicides are applied directly to the soil or to the plants growing in the infested area. The fungicides for this use are prepared as concentrated solutions or emulsions and as wettable or soluble powders for ready use.

Frequently compounds toxic to fungus are also toxic to plant and animal life, especially when they are water-soluble. Often fungicides must be effective in trace quantities and must not have deleterious color or opacity, for example when used in transparent films. When used in coating compositions, the fungicide must not alter the color, texture or drying properties of the said composition. These and other problems make the choice of fungicides difficult and the use precarious. The exacting requirements frequently justify the use of very costly materials. Accordingly, the fundamental purpose of this invention is to provide a superior low cost fungicide.

In the use of fungicides it has frequently been observed that destruction of fungus in soil, wood or in other natural habitat or in an article of commerce, the natural balance of microbiotic life is upset and then the population of destructive bacteria greatly increases. For this reason an active fungicide may not produce an overall beneficial result. Thus to be of general utility a good fungicide should also have bactericidal properties.

Accordingly, the fundamental purpose of the present invention is to provide a new fungicidal composition. A further purpose is to provide methods of minimizing fungal destruction in various articles of commerce normally subject to fungal attack. A still further purpose of this invention is to provide a bactericide, and especially one which is effective simultaneously as a fungicide. Other purposes of the invention will be apparent from the following description.

In accordance with this invention, it has been found that compounds of the following type are unusually effective fungicides:

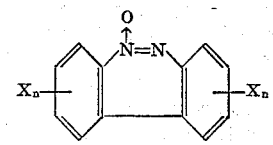

wherein X is selected from the class consisting of halogen atoms, alkyl radicals containing up to three carbon atoms, and halogen substituted alkyl radicals having up to three carbon atoms, and $n$ is an integer from zero (0) to two (2) inclusive.

Suitable compounds of this type are benzo(c)cinnoline-5-oxide and the various substituted benzo(c)cinnoline-5-oxides including:

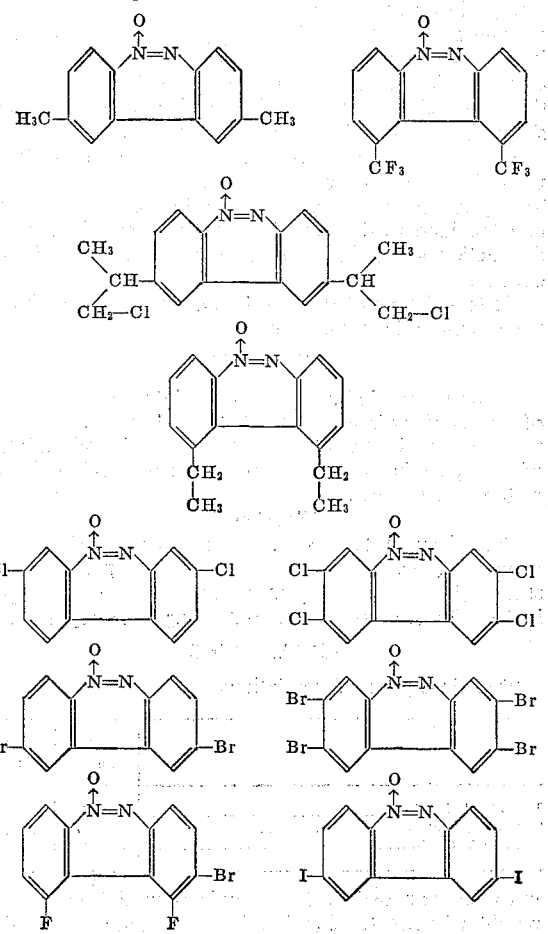

Analogues of these compounds containing other halogens in place of the chlorine will have similar effectiveness as fungicides.

These compounds may be prepared from benzene containing a nitro group and a chlorine atom in the ortho position by the condensation in the presence of a metallic catalyst followed by reduction with sodium sulfide in accordance with the following equation:

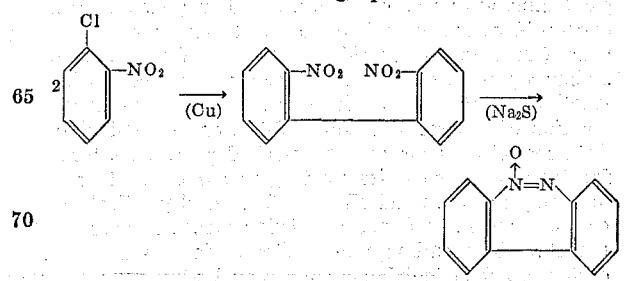

This compound may also be prepared by other methods known and described in the published literature.

The halogen substituted benzene derivatives may be prepared from the analogous o-nitrochloro benzene having the substituents in the desired relative positions. The condensation also takes place in the presence of a copper catalyst and the reduction by means of sodium sulfide.

The new compounds may be used for the impregnation of cloth and other textiles, lumber and other wood products and soils in the manner well known to the art. Being soluble in many organic substances, the products may be dissolved in the vehicle of a paint composition and may also be soluble in many plastic compositions. Thus the use of these compositions by conventional fungus control procedures is readily apparent. The new compounds may be prepared for use by dissolution in a suitable solvent or by suspension in another liquid carrier. Compositions may be formulated with wetting agents to provide a wettable powder for aqueous emulsion use or it may be prepared in a concentrated solution in a suitable organic solvent carrier. Other methods of application and incidental formulations will be apparent to one skilled in the use of fungicidal compositions.

The benzo(c)cinnoline-5-oxide is of unusual fungicidal utility because it has pronounced activity as a bactericide. Thus bacteria and fungus are simultaneously controlled, and the increase in bacteria population and its incident destruction are not experienced subsequent to the fungus control.

Further details of the novel uses are set forth with respect to the following examples.

EXAMPLE 1

In routine preliminary tests in petri dishes agar cultures of *Aspergillus niger* were treated with benzo(c)cinnoline-5-oxide at various dilutions. It was found that a dilution of one part in 10,000 resulted in substantial inhibition of the fungus growth.

EXAMPLE 2

Bacteriostatic tests with the organisms *Micrococcus pyogenes* (var. *aureus*) and *Salmonella typhosa* demonstrated that at all high concentrations down to one part in 10,000 were effective in controlling both organisms.

EXAMPLE 3

Two vinyl plastic formulations

| | (1) Parts | (2) Parts |
|---|---|---|
| Polyvinyl chloride | 100 | 100 |
| Tetrahydrofurfuryloleate | 50 | |
| Dioctyl phthalate | | 50 | were compounded with approximately 3.0 percent by weight of benzo(c)cinnoline-5-oxide. Films were fabricated from the formulations, both with and without the benzo(c)cinnoline-5-oxide, and then exposed to cultured *Aspergillus niger*. It was found that the benzo(c)cinnoline-5-oxide inhibited the fungus growth in the treated films, whereas the control films were readily attacked.

EXAMPLE 4

Fungistatic properties of benzo(c)cinnoline-5-oxide in paint films were compared with a widely used fungicide copper-8-hydroxy quinolinolate. A typical white house paint (Du Pont 40 Outside White) was formulated by adding 3 percent by weight of benzo(c)cinnoline-5-oxide. Another sample of the paint was modified by the incorporation of 3 percent of copper-8-hydroxy quinolinolate. Both modified paints and the original paint were tested for fungistatic properties by dipping numerous discs of filter paper in each and allowing them to dry. Each test disc was cut in half, one half being placed in agar and the other in a carbon free medium. Some samples of each were then individually inoculated with *Aspergillus niger*, some with *Alternaria sp.*, and others with *Pullularia pullulans*, test specimens being selected so that each organism in each medium was exposed to each paint film.

In all cases the films containing benzo(c)cinnoline-5-oxide were as good or better than those containing copper-8-hydroxy quinolinolate, but were not appreciably discolored as were the samples containing the other fungicide. Control samples were readily attacked by all three organisms.

EXAMPLE 5

Samples of 6-8 ounce cotton duck were treated with benzo(c)cinnoline-5-oxide. Other samples were treated with a good commercially available fungicide, cooper-8-hydroxy quinolinolate. The treatments involved immersing the fabric in benzene solutions of the two compounds. After drying both samples were found to have gained 2 percent in weight. The samples were cut in test strips 1 x 8 inches and were leached in running water for 24 hours. The samples were dried and buried in a standardized soil consisting of equal parts by weight of horse manure, cow manure, top soil and sand. The test soil was maintained at 28° C. in an atmosphere of 95 percent relative humidity. After a 14 day burial, the samples were recovered, washed with water and allowed to dry. Only badly discolored shreds of the untreated samples were found to remain. The treated strips were intact; those treated with copper-8-hydroxy quinolinolate were discolored, but those treated with benzo(c)cinnoline-5-oxide were unaltered in appearance.

EXAMPLE 6

The procedure of Example 4 was repeated except that benzo(c)cinnoline-5-oxide was replaced by a compound of the structure

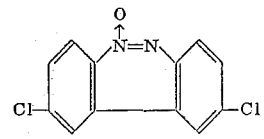

having been prepared by condensation of o,p-dichloronitrobenzene. Paint films so prepared are resistant to fungus attack.

The samples of the two treated cloths were treated on the Scott tester and the tensile strength of the individual specimens is set forth in the table.

*Table*

| | Tensile Strength | |
|---|---|---|
| | Unburied | Buried |
| Control | 135.6 | |
| Copper-8-hydroxy quinolinolate | 124.2 | 31.2 |
| | | 26.4 |
| | | 28.8 |
| | | 27.6 |
| Average | | 27.0 |
| Benzo(c)cinnoline-5-oxide | 129.0 | 114.6 |
| | | 110.4 |
| | | 113.4 |
| | | 117.6 |
| Average | | 114.0 |

The above data demonstrate that benzo(c)cinnoline-5-oxide not only has a fungicidal effect, but one that is superior to that of copper-8-hydroxy quinolinolate, a compound widely used as a fungicide.

When using the benzo(c)cinnoline-5-oxide and its homologs in soils or otherwise protecting plants, and especially food producing plants, as little as 0.001 percent based on the soil may be used. Higher concentrations, for example up to 1 percent may be used in the treatment of serious soil infections, especially where the plant is resistant to the mild toxicity and where the plant is not productive of food for animal or human consumption. In the treatment of plastics, paint compositions, wood products and textiles it has been found that compositions from 0.1 to 10 percent are very effective. The preferred usage of the benzo(c)cinnoline-5-oxide and homologs involves concentrations of from 0.01 to 5 percent by weight, based on the composition being treated. Both the smaller and greater proportions of fungicides are useful in protecting a wide variety of cellulosic or proteinaceous materials, such as fiberboard, leather, casein products, including adhesives and coating compositions. Animal and vegetable oils and fats may similarly be preserved by the incorporation of small amounts of benzo(c)cinnoline-5-oxide.

This application is a continuation-in-part of application Serial No. 387,541, filed October 21, 1953, by Leo J. Weaver, which application is now abandoned.

What is claimed is:

1. The method of making organic sheeted material of the class consisting of fabrics and films, which comprises incorporating in said sheeted material a compound having the structure

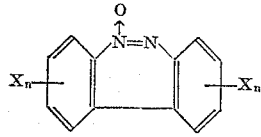

wherein X is selected from the class consisting of halogen atoms, alkyl radicals containing up to three carbon atoms and halogen substituted alkyl radicals having up to three carbon atoms, and $n$ is an integer from zero (0) to two (2) inclusive.

2. The method of protecting a textile from fungus which comprises dispersing in the textile a compound having the structure

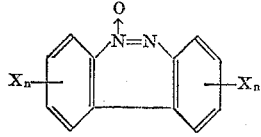

wherein X is a halogen atom and $n$ is an integer from zero (0) to two (2) inclusive.

3. The method of protecting an organic film from fungus which comprises dispersing in the said film a compound having the structure

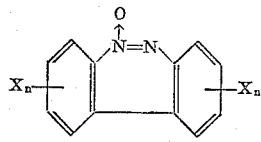

wherein X is a halogen atom and $n$ is an integer from zero (0) to two (2) inclusive.

4. A method of making organic sheeted material of the class consisting of fabrics and films resistant to fungi which comprises incorporating in the said sheeted material benzo(c)cinnoline-5-oxide.

5. A method of protecting a textile from fungus which comprises dispersing in the textile benzo(c)cinnoline-5-oxide.

6. A method of protecting organic films from fungus which comprises dispersing in the organic films benzo(c)-cinnoline-5-oxide.

7. Fungus resistant organic sheeted material of the class consisting of fabrics and films having dispersed therein a compound having the structure

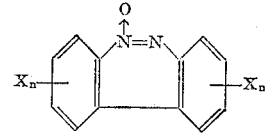

wherein X is selected from the class consisting of halogen atoms, alkyl radicals containing up to three carbon atoms and halogen substituted alkyl radicals having up to three carbon atoms, and $n$ is an integer from zero (0) to two (2) inclusive.

8. A fungus resistant textile which has incorporated therein a compound having the structure

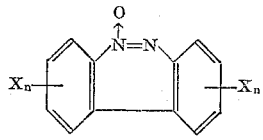

wherein X is a halogen atom and $n$ is an integer from zero (0) to two (2) inclusive.

9. A fungus resistant organic film having dispersed therein a compound having the structure

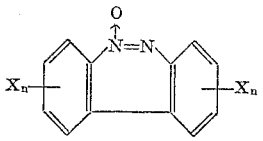

wherein X is a halogen atom and $n$ is an integer from zero (0) to two (2) inclusive.

10. A fungus resistant organic sheeted material of the class consisting of fabrics and films having dispersed therein benzo(c)cinnoline-5-oxide.

11. A fungus resistant textile having incorporated therein benzo(c)cinnoline-5-oxide.

12. A fungus resistant organic film having dispersed therein benzo(c)cinnoline-5-oxide.

References Cited in the file of this patent

UNITED STATES PATENTS 2,653,252  Ross _____ June 23, 1953

OTHER REFERENCES

U.S. Dept. Agriculture, Bureau of Entomology and Plant Quarantine, Bulletin No. E-425 (March 1938), pages 3 and 12.

U.S.D.A. Circular No. 523 (May 1936), pages 1, 2, 3 and 7.

Youman et al.: The Bacteriostatic Activity of 3500 Organic Compounds for *Mycobacterium tuberculosis* var. *hominis*, 1953, pages 1 and 567.